(12) United States Patent
Fuller

(10) Patent No.: US 7,496,928 B2
(45) Date of Patent: Feb. 24, 2009

(54) METHOD AND SYSTEM FOR MODERATING THREAD PRIORITY BOOST FOR I/O COMPLETION

(75) Inventor: Jeffrey C. Fuller, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 524 days.

(21) Appl. No.: 10/650,176

(22) Filed: Aug. 28, 2003

(65) Prior Publication Data

US 2005/0050550 A1 Mar. 3, 2005

(51) Int. Cl.
*G06F 9/54* (2006.01)
*G06F 9/46* (2006.01)
(52) U.S. Cl. .................................. 719/319; 709/226
(58) Field of Classification Search ................ 719/319; 709/226
See application file for complete search history.

(56) References Cited

U.S. PATENT DOCUMENTS

| 5,247,675 | A | | 9/1993 | Farrell et al. | |
|---|---|---|---|---|---|
| 5,630,128 | A | * | 5/1997 | Farrell et al. | 718/103 |
| 5,920,325 | A | | 7/1999 | Morgan et al. | |
| 6,021,425 | A | * | 2/2000 | Waldron et al. | 718/103 |
| 6,105,053 | A | * | 8/2000 | Kimmel et al. | 718/105 |
| 6,243,788 | B1 | | 6/2001 | Franke et al. | |
| 6,874,144 | B1 | * | 3/2005 | Kush | 718/103 |
| 7,028,298 | B1 | * | 4/2006 | Foote | 718/104 |
| 2005/0022186 | A1 | * | 1/2005 | Accapadi et al. | 718/100 |

* cited by examiner

*Primary Examiner*—Meng-Ai An
*Assistant Examiner*—Abdou K Seye
(74) *Attorney, Agent, or Firm*—Marshall, Gerstein & Borun LLP

(57) ABSTRACT

A system and method uses a heuristic approach to manage the boosting of thread priorities after I/O completion to improve system performance. Upon detection of the completion of an I/O operation in response to a request, the system thread does not automatically boost the priority of the thread that made the I/O request by a fixed amount. Instead, the system thread determines whether to boost the requesting thread's priority by applying heuristic criteria based on the I/O operation status, such as whether the system thread has additional I/O requests to process, how many I/O request packets have been completed in the current thread context without a priority boost to the requesting thread, and the time that has passed since the last boosted I/O completion.

14 Claims, 4 Drawing Sheets

METHOD AND SYSTEM FOR MODERATING THREAD PRIORITY BOOST FOR I/O COMPLETION

TECHNICAL FIELD

This invention relates generally to computer operations, and more particularly to the operation of a computer that has a plurality of threads running thereon.

BACKGROUND OF THE INVENTION

A modern computer with an operating system implementing multi-threading typically has many threads going at a given time. Generally, the threads are context-switched in and out all the time, and which thread is switched in (i.e., getting to use the processor) depends on the priorities of the threads. How the switching is managed can have a significant impact on the performance of the computer.

In the traditional operating system device driver model, a system thread (e.g., the thread for a system-provided driver) performs an I/O operation in response to an I/O request from an application or a higher-level driver. Once the system thread has completed the requested I/O operation, it boosts the priority of the thread that made the request. This priority boost, which is a standard way of implementing I/O drivers, increases the likelihood that the thread that made the request will be context-switched in so that it can consume the data resulting from the I/O operation. In some situations, however, the system thread will have its priority superceded by the boosted thread. This can cause the system thread to be context-switched out and in frequently, which can have significant detrimental effect on the overall system performance.

SUMMARY OF THE INVENTION

In view of the foregoing, the present invention provides a system and method that uses a heuristic approach to manage the boosting of thread priorities to improve system performance. Upon detection of the completion of an I/O operation in response to a request, the system thread does not automatically boost the priority of the thread that made the I/O request by a fixed amount, as is done conventionally. Instead, the system thread determines whether to boost the requesting thread's priority by applying specific heuristic criteria based on the I/O status, such as whether the system thread has additional I/O requests to process, how many I/O request packets have been completed in the current thread context without a boost to the requesting thread's priority, the time that has passed since the last priority-boosted I/O completion, etc. By allowing the system thread to decide whether to boost the priority of the requesting thread based on heuristic criteria, the system can optimize the overall system performance by trying to accomplish more I/O operations before being context switched out.

DETAILED DESCRIPTION OF THE INVENTION

Figure 1:
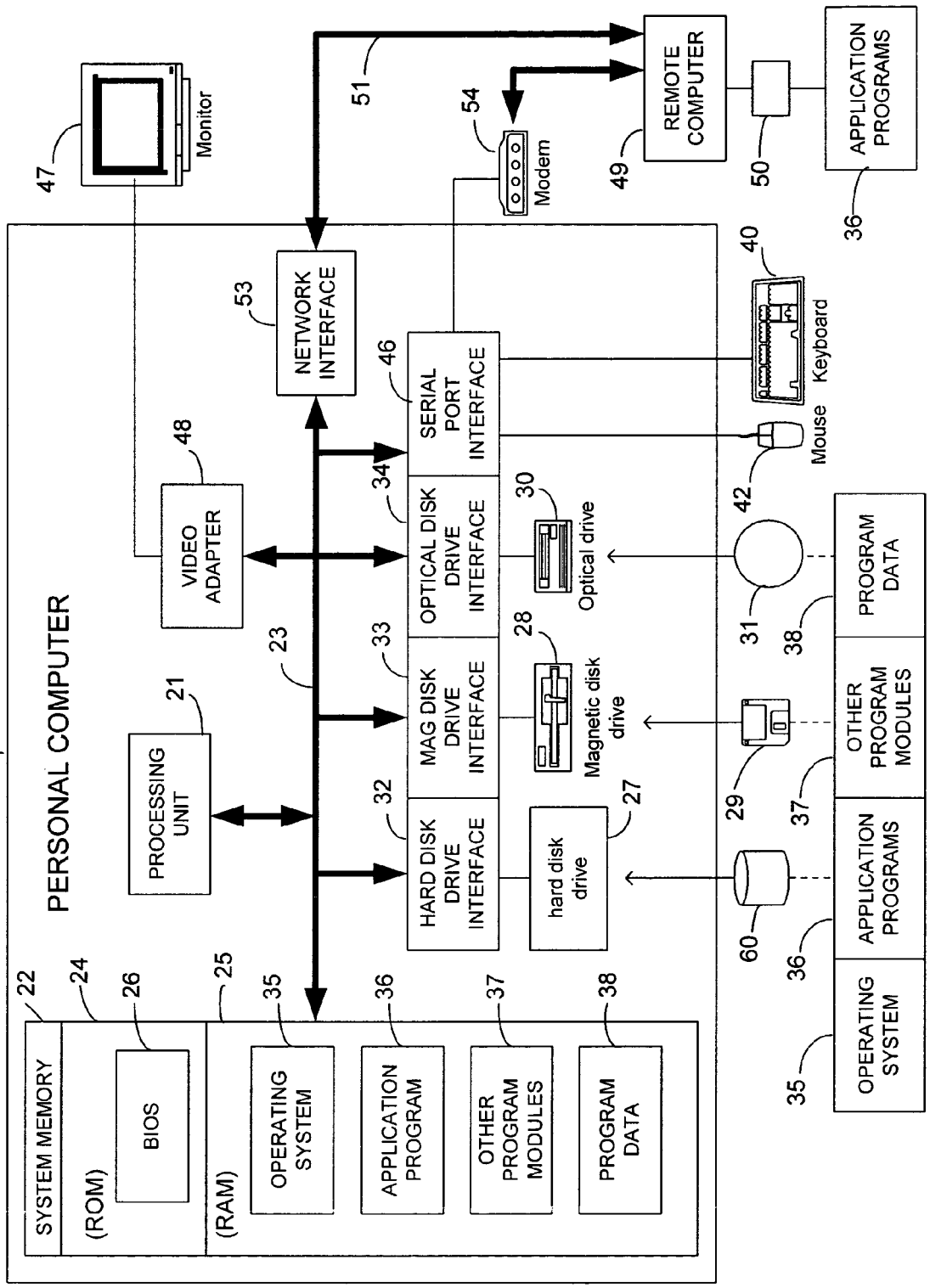
FIG. 1 is a block diagram generally illustrating an exemplary computer system on which the management of thread priorities upon I/O completion in accordance with the invention may be implemented.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may implement the system and method for managing thread priority for I/O completion in accordance with the invention. The thread priority management for I/O completion of the invention will be described in greater detail with reference to FIGS. 2-4. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
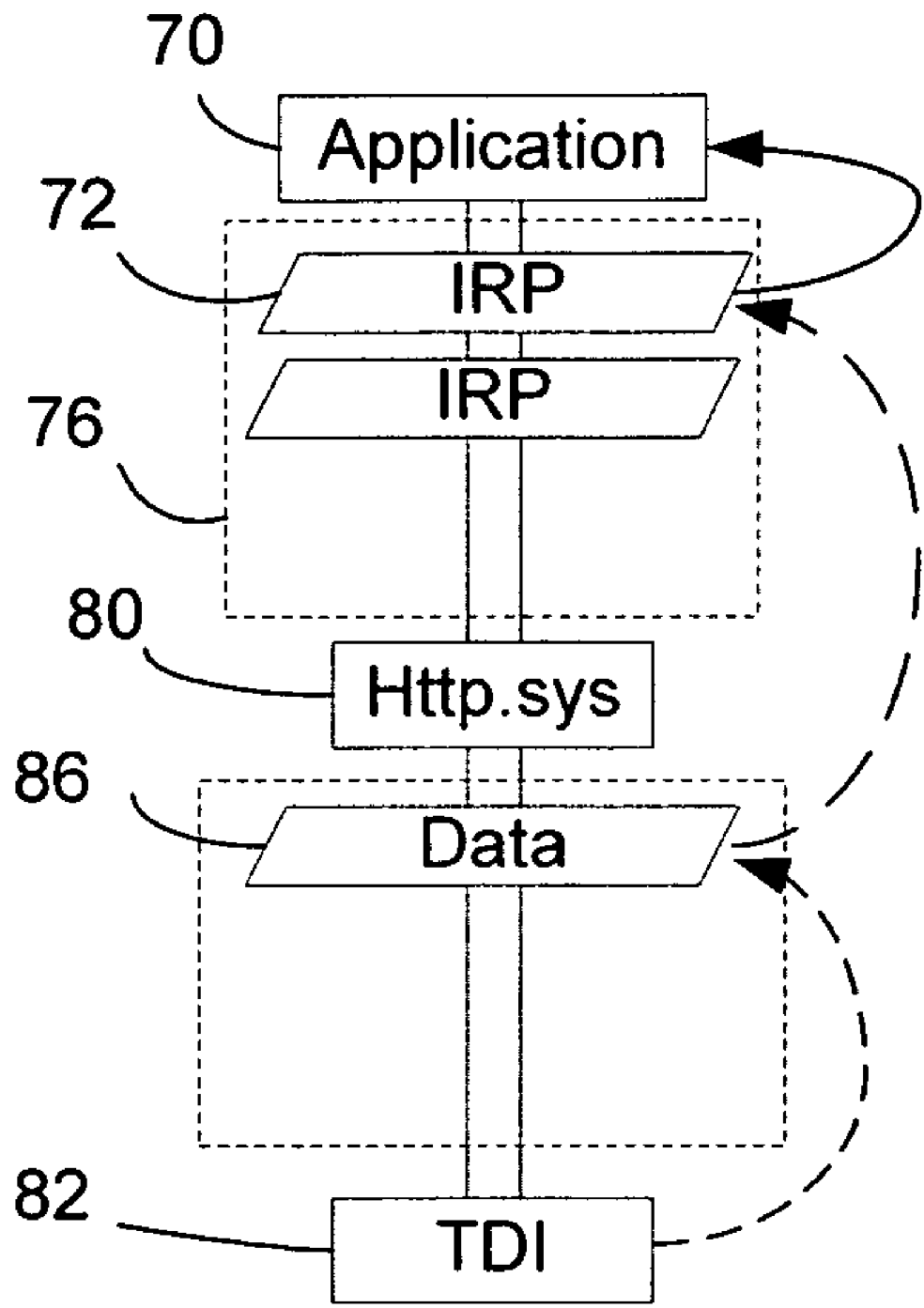
FIG. 2 is a schematic diagram showing an application that makes an I/O request and a system-provided driver that handles the I/O request.

Referring now to FIG. 2, the present invention is directed to a new approach to handling thread priorities in the event of completion of an I/O request. For example, as shown in FIG. 2, an application 70 running in the user mode may make a request for an I/O operation (e.g., to obtain data) and posts an input buffer 72 for that I/O request in a queue 76. In one implementation, the input buffer is in the form of an I/O request packet (IRP), which is a data structure used in the Windows operating systems of Microsoft Corporation for asynchronous delivery of data, and is marked completed when the requested I/O is done. A system-provided driver 80 (e.g., an Http.sys driver) handles the I/O request by inserting data into the input buffer 72. The system-provided driver 80 may obtain the data from a lower-level driver 82 (e.g., a Transport Driver Interface (TDI) driver), which may obtain data from a data source, such as the Internet. As shown in FIG. 2, the lower-level driver 82 inserts data into buffers 86 of the driver 80, which then copies the data into the input buffer 72 posted by the application 70. As is typical in a computer that has a multi-threading operating system, the application 70 runs in the user mode and corresponds to an application thread, and the system-provided driver runs in the kernel mode and corresponds to a system thread.

In the traditional operating system device driver model, the system thread that handles the I/O request of the application thread (or the thread of a higher-level driver) would boost the priority of the application thread once the system thread has completed the I/O operation in response to the request. The priority boost is by a fixed increment in the priority level, such as 2, and the recommended boost value is typically given in a public interface file (e.g., ntddk.h for the Windows NT operating system of Microsoft Corporation). The purpose of this priority boost is to increase the likelihood that the application thread will be switched in, i.e., given possession of the processor, so that it can consume the data obtained in the I/O operation or free up resources in a timely manner. The problem with the conventional approach is that the system thread that provides the boost to the application thread may be immediately preempted by the boosted application thread and be switched out, preventing it from performing more I/O operations. This reduces the possibility of batch processing I/O requests and, as a result, may have detrimental effects on the overall system performance, due to the significant CPU cost associated with context switching.

Figure 3:
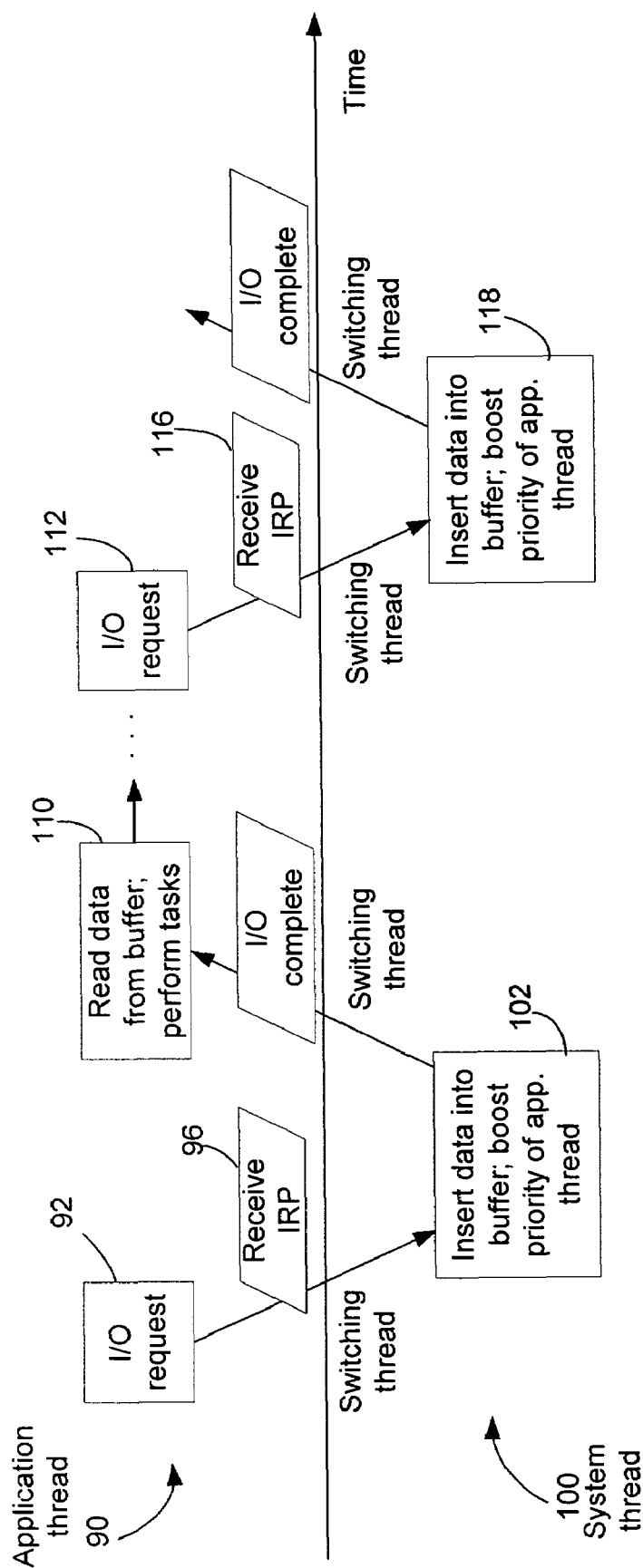
FIG. 3 is a schematic diagram showing an example of switching between the application thread and the system thread if the priority boost management of the invention is not implemented.

By way of example, FIG. 3 shows an exemplary sequence of switching between the application thread and the system thread for the driver that handles the I/O requests, with the convention thread-boosting after each I/O completion. As shown in FIG. 3, the application thread (in the user mode) 90 makes an I/O request (step 92) and posts an I/O buffer 96, and at a later time the system thread 100 for the driver (in the kernel mode) is context switched in to handle the I/O request. The system thread 100 obtains the requested data and copies the data into the I/O buffer (step 102). The system thread 100 reports the completion of the I/O operation, and then boosts the priority of the application thread (step 102). The priority boost to the application thread causes the system thread to be context switched out and the application thread 90 context switched in. The application thread 90 reads the data from the buffer and performs its operations (step 110). Later, the application thread makes another I/O request (step 112) and posts another I/O buffer (116), and the system thread 100 of the driver is again switched in to handle the I/O request. After the I/O operation for the second request is completed, the system thread 100 reports the I/O completion and again boosts the priority of the application thread (step 118), causing another context switch to the application thread 90. As can be seen from FIG. 3, a context switch occurs after the completion of every I/O request as a result of the priority boost to the application thread upon I/O completion. In other words, each time the system thread 100 is context switched in, it can handle only one I/O request before it is switched out. This is undesirable when the application thread makes many I/O requests, and the frequent context switching can incur a large amount of time and overhead. In addition, the frequent context switching may increase resource contention, as the boosted thread may initiate additional I/O requests before the system thread can release its I/O resources. As a result, the performance of the system may be significantly reduces.

In accordance with the invention, this problem is effectively prevented by moderating the boost of the application thread after the completion of an I/O operation in response to a request. Rather than automatically boosting the priority of the application thread at each I/O completion, the system thread determines whether a priority boost should be applied based on heuristic criteria based on the status of I/O operations. In a preferred embodiment, the priority boost is reduced or eliminated at an I/O completion unless one or more of conditions are met. First, the priority boost may be made when the system thread has no additional I/O requests to process in the immediate future and thus would not benefit from being able to finish its CPU time quantum without interruption. The system thread may also boost the priority of the application thread when a threshold number of IRPs have been completed in the current thread context without interruption. In other words, if the system thread has completed responding to a pre-set number of I/O requests without the interruption caused by context switching induced by priority boosting, it may allow the application to switched in to consume the data generated by the I/O operations. The system thread may also decide to boost the priority of the application thread if a pre-set threshold amount of time has passed since the last time the priority of the application thread was boosted after an I/O completion, to allow the application thread to be context switched in to perform its operations.

Figure 4:
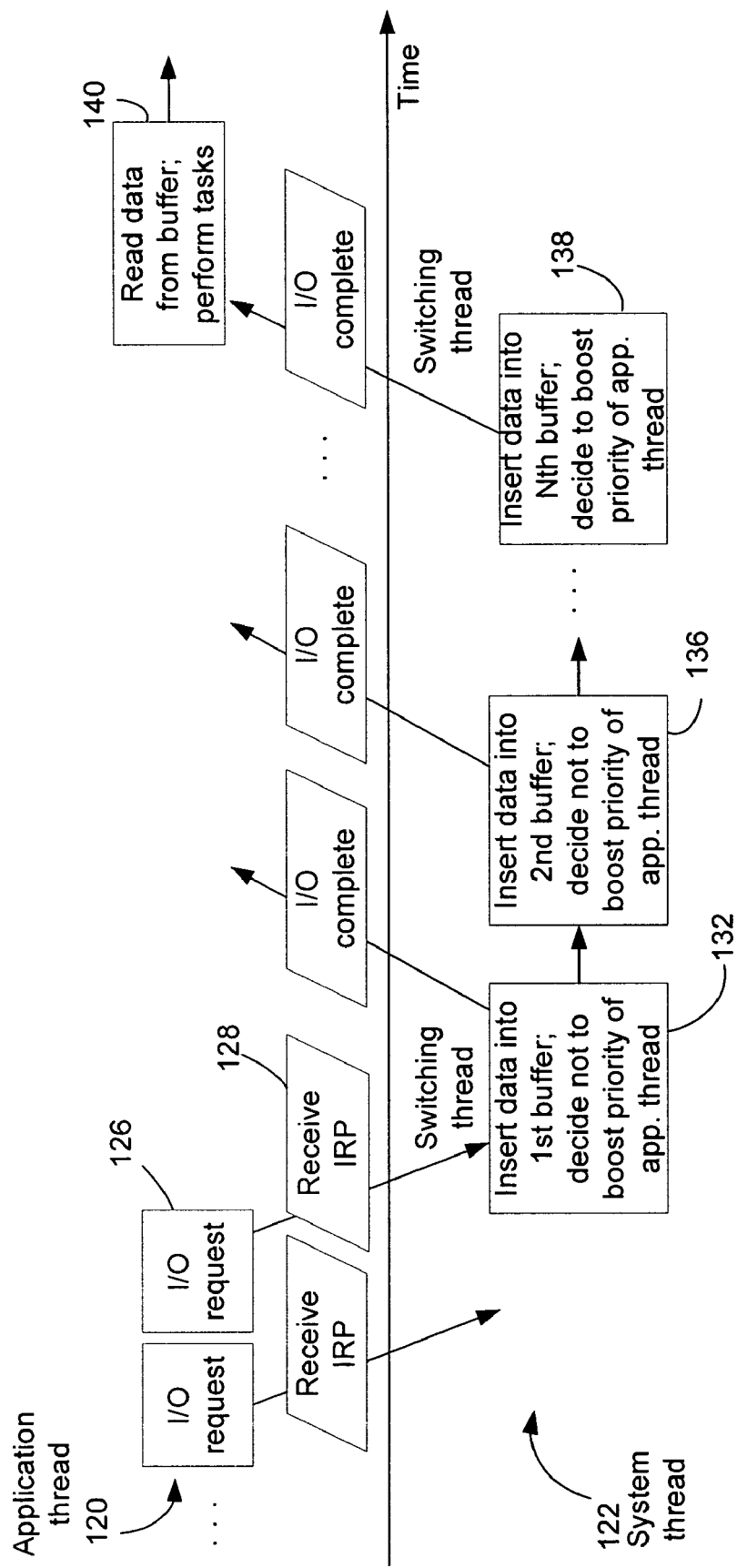
FIG. 4 is a schematic diagram showing an example of switching between the application thread and system thread when the priority boost for the thread requesting the I/O upon I/O completion is moderated in accordance with the invention.

Again by way of example, FIG. 4 shows an exemplary sequence of context switching between an application thread 120 and a system thread 122 for the driver, with the priority boost after I/O completion moderated in accordance with the invention. The user mode application thread 120 may make multiple I/O requests (steps 126) and posts I/O buffers 128 for the requests. When the system thread 122 for the driver is switched in, it responds to one I/O request, and reports the completion of the requested I/O operation. The system thread, however, decides not boost the priority of the application thread at this time (step 132). This allows the system thread 122 to stay in, i.e., to remain in possession of the processor. As a result, the system thread 122 can carry out the I/O operation for another I/O request. After completion of this I/O operation, the system thread reports the completion but again decides not to boost the priority of the application thread (step 136). This allows it to perform more I/O work. Finally, the system thread 122 decides that it is time to boost the priority of the application thread to allow it to be context switched in (step 138). This may be because there is no more I/O to be done, or the number of I/O operations it has performed since it was switched in has reached a threshold number, or the time elapsed since the time it was switched in (or when the last time the priority boost was made) has reached a threshold length of time, etc. It will be appreciated that other heuristic criteria based the status of I/O operations can be set up for the system thread to determine whether it should boost the priority of the application thread 120. When the system thread 122 decides that it is time to allow the application thread 120 to be switched in, it boosts the priority of the application thread (step 138). As a result, the system thread is switched out, and the application thread is switched in and consumes the data or performs other tasks (step 140).

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A computer-readable medium having computer-executable instructions for performing steps for processing Input/Output ("I/O") requests, comprising:
receiving an I/O request from an application thread;
performing an I/O operation in response to the I/O request; and
upon completion of the I/O operation, determining whether to boost a priority of the application thread according to criteria based on, future I/O operations to be performed for the application thread or whether a period of time since a last time the priority of the application thread was boosted has reached a threshold length wherein the criteria for determining whether to boost the priority of the application thread includes an analysis of the number of I/O operations to be performed in the future for the application thread and if the number is below a threshold, refraining from increasing the priority of the application thread until the I/O operations are complete;
wherein the application thread posts a data buffer in connection with the I/O request, and the step of performing the I/O operation includes copying data into the I/O buffer.

2. A computer-readable medium as in claim 1, having further computer-executable instructions for performing steps of:
if the step of determining determines not to boost the priority of the application thread, performing a further I/O operation for the application thread, and determining again whether to boost the priority of the application thread.

3. A computer-readable medium as in claim 1, having further computer-executable instructions for performing the step of boosting the priority of the application thread when the step of determining determines that the priority of the application is to be boosted.

4. A computer-readable medium as in claim 3, wherein the step of boosting boosts the priority of the application thread by a pre-selected level.

5. A computer-readable medium as in claim 4, wherein the pre-selected level is fixed.

6. A computer-readable medium as in claim 1, wherein the criteria for determining whether to boost the priority of the application thread include whether a number of I/O operations performed in a current thread context for the application thread has reached a threshold number.

7. A method of processing Input/Output ("I/O") requests, comprising:
receiving an I/O request from an application thread;
performing an I/O operation in response to the I/O request;
upon completion of the I/O operation, determining whether to boost a priority of the application thread according to criteria based on future I/O operations to be performed for the application thread or whether a period of time since a last time the priority of the application thread was boosted has reached a threshold length wherein the criteria for determining whether to boost the priority of the application thread include determining the number of I/O operations to be performed in the future and if the number is below a threshold, refraining from increasing the priority of the application thread until the I/O operations are complete; and boosting the priority of the application thread by a pre-selected fixed level when the step of determining determines that the priority of the application is to be boosted;

wherein the application thread posts a data buffer in connection with the I/O request, and the step of performing the I/O operation includes copying data into the I/O buffer.

8. A method as in claim 7, having further steps of:

if the step of determining determines not to boost the priority of the application thread, performing a further I/O operation for the application thread, and determining again whether to boost the priority of the application thread.

9. A method as in claim 7, wherein the criteria for determining whether to boost the priority of the application thread include includes an analysis of the number of I/O operations to be performed in the future for the application thread.

10. A method as in claim 7, wherein the criteria for determining whether to boost the priority of the application thread include whether a number of I/O operations performed in a current thread context has reached a threshold number.

11. A computer system comprising a processor being configured according to computer executable instructions, a memory for storing computer executable instructions and an input/output circuit, the computer executable code comprising instructions for creating:

an application thread making an I/O request;

a system thread for responding to the I/O request, the system thread being programmed to receive the I/O request from the application thread, perform an I/O operation in response to the I/O request, and upon completion of the I/O operation, determine whether to boost a priority of the application thread according to criteria based on, future I/O operations to be performed for the application thread or whether a period of time since a last time the priority of the application thread was boosted has reached a threshold length;

wherein the system thread is programmed to boost the priority of the application thread by a pre-selected fixed level when the system thread determines that the priority of the application is to be boosted;

wherein the criteria for determining whether to boost the priority of the application thread include determining the number of I/O operations to be performed in the future and if the number is below a threshold, refraining from increasing the priority of the application thread until the I/O operations are complete; and wherein the application thread posts a data buffer in connection with the I/O request, and the I/O operation performed by the system thread includes copying data into the I/O buffer.

12. A computer system as in claim 11, wherein the system thread is further programmed to perform steps of:

if the system thread determines not to boost the priority of the application thread, performing a further I/O operation for the application thread, and determining again whether to boost the priority of the application thread.

13. A computer system as in claim 11, wherein the criteria for determining whether to boost the priority of the application thread include includes an analysis of the number of I/O operations to be performed in the future for the application thread.

14. A computer system as in claim 11, wherein the criteria for determining whether to boost the priority of the application thread include whether a number of I/O operations performed in a current thread context for the application thread has reached a threshold number.

\* \* \* \* \*